United States Patent [19]
Mori et al.

[11] 3,892,717
[45] July 1, 1975

[54] PROCESS FOR PRODUCING MALEIC ACID MODIFIED POLYMERIZED ETHYLENE WAX

[75] Inventors: Akikazu Mori; Hideo Nara, both of Iwakuni; Toshiki Kataoka, Yamaguchi; Teiji Kato; Toru Tomoshige, both of Iwakuni; Katsumi Funakoshi; Toshio Kobayashi, both of Otake, all of Japan

[73] Assignee: Mitsui Petrochemical Industries Ltd., Tokyo, Japan

[22] Filed: July 9, 1973

[21] Appl. No.: 377,428

Related U.S. Application Data

[62] Division of Ser. No. 146,849, May 25, 1971, abandoned.

[52] U.S. Cl.... 260/78.4 D; 260/94.9 DA; 260/94.9 E; 260/94.9 GC
[51] Int. Cl. ............................................. C08f 27/00
[58] Field of Search . 260/88.25, 94.9 DA, 94.9 GC, 260/78.4 D, 877

[56] References Cited
UNITED STATES PATENTS
2,766,214 10/1956 Erchak et al. ............... 260/94.9 GC
3,278,513 10/1966 Jahrstorfer et al. .......... 260/94.9 GC
3,642,746 2/1972 Kashwia et al. .............. 260/94.9 DA
3,687,905 8/1972 Dorer ......................... 260/94.9 GC FOREIGN PATENTS OR APPLICATIONS
1,929,863 12/1970 Germany
1,056,175 1/1967 United Kingdom
686,192 5/1964 Canada
1,140,649 1/1969 United Kingdom
2,014,330 4/1970 France

*Primary Examiner*—Edward J. Smith
*Attorney, Agent, or Firm*—Sherman & Shalloway

[57] ABSTRACT

A process for producing a maleic acid modified waxy ethylene polymer which comprises polymerizing ethylene in the presence of hydrogen using as a catalyst a halogen compound of titanium and/or vanadium supported on a carrier composed of a hydrocarbon-insoluble magnesium-containing compound and an organoaluminum compound, the amount of hydrogen being 3 to 90 molar % of the vapor phase in the polymerization vessel, except the vapor portion of the solvent, and oxidizing and modifying the waxy ethylene polymer by reaction with a maleic acid compound.

11 Claims, No Drawings

PROCESS FOR PRODUCING MALEIC ACID MODIFIED POLYMERIZED ETHYLENE WAX

This application is a divisional application of Ser. No. 146,849 filed May 25, 1971 and now abandoned.

This invention relates to a process for producing wax by polymerizing ethylene, and more specifically to a process for producing a modified wax from ethylene in one step by polymerizing ethylene in the presence of large quantities of hydrogen with subsequently oxidation and modification of the oxidized wax with a maleic acid compound.

Previously, wax has been produced mainly by extraction and purification of a distillation residue in the petroleum refining process. In recent years, commercially available waxes have included a new type produced by thermal degradation of polyethylene in order to meet an increased demand for waxes in old and newly developed uses. This type of wax is produced by thermal degradation of low density polyethylene obtained by the free radical polymerization of ethylene. It is therefore necessary to polymerize ethylene first, and then decompose it by heat to thereby reduce its molecular weight.

Polyethylene produced by the Ziegler process wherein ethylene is polymerized using a coordination catalyst is characterized by the fact that its molecular weight can be freely varied. Therefore, polyethylene having a molecular weight which gives a waxy state can be directly produced without the need for an extra step of thermal degradation which is required when starting from high pressure polyethylene. Conventional polyethylene waxes obtained by the Ziegler process become gelled upon oxidation, and the oxidation reaction cannot efficiently proceed. Therefore, it is said that they are not suitable for use as oxidized waxes.

Accordingly, an object of the present invention is to provide a process for producing wax from ethylene in one step without the need for a thermal degradation step.

Another object of the invention is to provide a process for producing a maleic acid modified polyethylene wax; in other words, a modified waxy ethylene polymer.

The foregoing objects of the invention are achieved by a process of the invention which comprises polymerizing ethylene in a saturated hydrocarbon and/or melted wax obtained as a polymerization solvent in the presence of hydrogen and/or an α-olefin using as a catalyst a halogen compound of titanium and/or vanadium supported on a carrier composed of a hydrocarbon-insoluble magnesiumcontaining compound, and an organoaluminum compound under the following conditions:

a. the atomic ratio of aluminum to titanium and/or vanadium in the catalyst is 1–100:1,
b. the concentration of the catalyst in the polymerization solvent defined above is such that the amount of aluminum atoms in the catalyst ingredient is 0.01 to 10 millimoles per liter of the polymerization solvent.
c. ethylene, hydrogen and α-olefin are fed in amounts such that the vapor phase in the polymerization vessel, except the vapor portion of the solvent, consists of 5 to 90 molar % of hydrogen, 0 to 35 molar % of α-olefin and the remainder being ethylene, and
d. the polymerization temperature is a temperature at which the resultant polymer is present as a liquid, and the polymerization pressure is from 20 to 100 kg/cm$^2$ in the case of using a saturated hydrocarbon solvent and from 5 to 100 kg/cm$^2$ in the case of the melted wax formed, to form a waxy ethylene polymer having a density of 0.85 to 0.98 g/cm$^3$ and a viscosity average molecular weight of 400 to 20,000; oxidizing the waxy ethylene polymer; and modifying the oxidized wax with a maleic acid compound.

The term "wax" used in the present invention means a waxy substance that has a softening point (determined by the ring and ball test in accordance with JIS K-2531) of 80° to 135° C., a melt viscosity at 140°C. of 1 to 10$^5$ centipoises, a hardness (determined by penetration in accordance with JIS K-2530) of 0 to 50, a density of 0.85 to 0.98 g/cm$^3$, and a viscosity average molecular weight (the viscosity of the polymer is measured at 135° C. using decalin as a solvent, and then calculated by the formula $Mv = 2.51 \times 10^{-4} [\eta] 1.235$) of 400 to 2,000.

Examples of the magnesium-containing compound useful as the support in the invention include hydrocarbon-insoluble inorganic compounds in finely divided form, such as magnesium oxide, magnesium hydroxide, magnesium chloride, magnesium oxychloride, magnesium carbonate, and basic magnesium carbonate, the preferred being magnesium chloride and magnesium oxide and the most preferred being magnesium chloride. Compounds containing magnesium and other metal atoms such as magnesium aluminate, may also be used. The catalyst support should have a specific surface area of at least 20 m$^2$/g, preferably, 40 to 500 m$^2$/g, and an average particle diameter of 0.5 to 500μ (microns).

It is preferable to treat the support with an electron donor prior to supporting the titanium and/or vanadium halogen compounds. The electron donor is either liquid or gaseous under the treating conditions, and includes aliphatic carboxylic acids, aromatic carboxylic acids, alkyl esters of aliphatic carboxylic acids, alkyl esters of aromatic carboxylic acids, aliphatic ethers, cyclic ethers, aliphatic ketones, aromatic ketones, aliphatic aldehydes, aliphatic alcohols, aliphatic acid halides, aliphatic nitriles, aromatic nitriles, aliphatic amines, aromatic amines, aliphatic phosphines or aromatic phosphines. Examples of the preferred electron donors include aliphatic carboxylic acids such as acetic acid, propionic acid, valeric acid and acrylic acid; aromatic carboxylic acids such as benzoic acid, and phthalic acid; aliphatic carboxylic acid esters as methyl formate, dodecyl formate, ethyl acetate, butyl acetate, vinyl acetate, methyl acrylate, octyl butyrate, ethyl laurate, and octyl laurate; aromatic carboxylic acid esters such as methyl benzoate, ethyl benzoate, octyl paraoxybenzoate, and dioctyl phthalate; aliphatic ethers such as ethyl ether, hexyl ether, allylbutyl ether, and methyl undecyl ether; cyclic ethers such as tetrahydrofuran, dioxane, and trioxane; aliphatic amines such as methylamine, diethylamine, tributylamine, octylamine, and dodecylamine; aromatic amines such as pyridine, aniline and naphthylamine; aliphatic ketones such as acetone, methyl isobutyl ketone, ethyl butyl ketone, and dihexyl ketone, aliphatic aldehydes such as propionaldehyde; aliphatic alcohols such as methanol, ethanol, isopropanol, hexanol, 2-ethyl hexanol, octanol, and dodecanol; aliphatic nitriles such as acetonitrile, valeronitrile, and acrylonitrile; aromatic nitriles such as benzonitrile and phthalonitrile; aliphatic acid amides such as acetamide; and phosphines such as triethyl phosphine and triphenyl phosphine.

The treatment of the support with the electron donor may be performed by contacting the support intimately with the electron donor at a temperature below the decomposition temperature of the support.

A halogen compound of titanium and/or vanadium is used as a catalyst component supported on the carrier. The preferred halogen compounds are titanium tetrachloride, titanium tetrabromide, monoalkyl trichlorotitanate, dialkyl dichlorotitanate, vanadium tetrachloride, and vanadium oxytrichloride. The conjoint use of the titanium compound and the vanadium compound may result in a wider distribution of the molecular weight of the resultant wax or an increased polymerization activity by the synergistic effect, which can in turn lead to a reduction in the amount of catalyst used. The preferred ratio of titanium to vanadium is 1/10 to 300/1 in terms of atomic ratio. The preferred amount of catalyst supported on the carrier is 0.05 – 1.0 m mole calculated as the titanium and/or vanadium metal.

The titanium or vanadium halogen compound may be supported on the carrier by a variety of methods which include, for example, the immersion of the carrier or one pre-treated with an electron-donor defined above in a liquid titanium or vanadium halogen compound, the immersion of the carrier or the pre-treated one as above in a solution or suspension in a solvent of the titanium or vanadium halogen compound, the passing of a vapor of the titanium or vanadium halogen compound through a bed of the carrier or the pre-treated one as above, and the copulverization treatment of the carrier together with the vanadium or titanium halogen compound.

The organoaluminum compound to be combined with the halogen compound of titanium and/or vanadium supported on the carrier includes, for example, trialkyl aluminums such as triethyl aluminum, triisobutyl aluminum, and trihexyl aluminum; dialkyl aluminum halides such as diethylaluminum chloride, diethylaluminum bromide, and dibutyl aluminum chloride; alkylaluminum sesquihalides such as ethylaluminum sesquichloride; alkylaluminum dihalides such as ethylaluminum dichloride, ethylaluminum difluoride, and butylaluminum dichloride; and dialkylaluminum alkoxides such as diethylaluminum ethoxide, diethylaluminum butoxide, and diethylaluminum phenoxide.

The ratio of the aluminum component to the component supported on the carrier is preferably 100/1 – 1/1 in terms of the atomic ratio of the aluminum atom to the titanium and/or vanadium atom.

In the practice of the process of the invention, the same apparatus and procedure as used in the production of thermoplastic resins in general using the Ziegler-type catalyst can be used. The characteristic of the process of the invention is that the polymerization of ethylene is performed at higher temperatures and pressures using larger quantities of hydrogen and/or $\alpha$-olefin.

Preferred $\alpha$-olefins useful in the invention are $\alpha$-olefins having 3 to 12 carbon atoms such as propoylene, 1-butene, 1-hexene, and 4-methyl-1-pentene.

It is preferable that the amounts of hydrogen and/or $\alpha$-olefins be adjusted according to the composition of the vapor phase in the polymerization vessel. Where hydrogen alone is used, the amount may vary between 3 and 90 molar %, preferably, between 5 and 70 molar %, most preferably between 10 and 60 molar %. When hydrogen and the $\alpha$-olefin are conjointly used, the amounts may vary according to the type of $\alpha$-olefin used. For example, when hydrogen is used together with propylene, the amount of hydrogen is from 3 to 70 molar %, and the amount of propylene is from 0 to 35 molar %. In the case of the conjoint use of hydrogen and 1-butene, the amount of hydrogen is 3 to 70 molar %, and the amount of 1-butene is up to 20 molar %.

The polymerization reaction according to the present invention is carried out in the presence of a polymerization solvent defined hereinbefore at high temperatures and pressures.

The polymerization reaction must be carried out at a temperature at which the resultant ethylene polymer is liquid in the reaction system or a temperature above this point. Ethylene polymers having a viscosity average molecular weight of 400 to 20,000 and a density of 0.85 to 0.98 g/cm$^3$ can be obtained by performing the polymerization under conditions such that the product substantially forms a homogeneous phase with the saturated hydrocarbon solvent at high temperatures (it is presumed that most of the resultant polymer is dissolved in the solvent, and the remainder is in the molten state) or forms a homogeneous liquid phase by itself. The preferred polymerization temperature ranges from 130°C. to 200°C. The pressure used for the reaction may vary between 20 and 100 kg/cm$^2$, preferably between 30 and 60 kg/cm$^2$. Examples of the saturated hydrocarbons which can be used in the invention as the polymerization solvent include pentane, cyclopentane, methyl cyclopentane, hexane, isohexane, cyclohexane, heptane, isoheptane, octane and isooctane. When the solvent used is the wax formed the pressure is usually 5 kg/cm$^2$ or higher.

Since the resulting waxy polyethylene is of low viscosity and liquid at the polymerization temperature, it can be used as the polymerization solvent as mentioned above. In such cases, the catalyst can be supplied to the polymerization zone in the form of a solution or suspension of a small amount of a hydrocarbon solvent such as hexane.

The reaction product withdrawn from the polymerization vessel is liquid because of being at high temperatures and pressures. When the pressure is reduced to approximately atmospheric pressure in the course of the product being transferred to the collector, the polymerization solvent and unreacted comonomer are vaporized, and the molten polymer is recovered at the bottom of the collector. The polymer can be directly fed to a flaker or processing machine.

Of the waxy ethylene polymers obtained by the process of the present invention prior to maleic acid modification, those having a density of 0.94 to 0.98 g/cm$^3$ have superior mechanical pulverizability, high abrasion resistance and hardness as compared with the conventional waxes sold under the trade name Microwax, and therefore find suitable application in printing ink, dry color pigment dispersants, and paper processing agents. Addition of small amounts of such waxes to shapable polystyrene, polypropylene, or polyvinyl chloride resin leads to the improvement of smoothness and mold releasability.

Those having a density of 0.85 to 0.94 g/cm$^3$ have higher softening and melting points than low density waxes produced by thermal degradation of high pressure polyethylene.

The waxy ethylene polymers obtained by the process of the present invention have the advantage that they have higher thermal stability and less deterioration in color than the wax produced by thermal degradation of high pressure polyethylene.

When ethylene is polymerized by the process of the invention in the presence of hydrogen alone, a straight-chain polyethylene wax having a density of 0.96 to 0.98 g/cm$^3$, and a softening point (as determined by the ring and ball test according to JIS K-2531) of 128° to 135°C. is obtained. By using the α-olefin together with hydrogen, the density and the degree of crystallinity of the resulting waxy ethylene polymer can be reduced to the desired levels, and waxes having the respective characteristics can be produced.

The molecular chain of the wax of the invention obtained by polymerization of ethylene in the presence of hydrogen and an α-olefin contains very many lower alkyl branches which are assumed to have resulted from the copolymerization of the α-olefin, thereby allowing for the modification of these waxes since these alkyl branches are quite reactive.

The alkyl branches contained in the waxes obtained by the invention are mostly short chains. Since high pressure polyethylene has many long branched chains because it is produced by free radical-type polymerization, polyethylene waxes produced from the high pressure polyethylene have less flowability in the molten state and have lower softening points as compared with the waxes of the present invention having substantially the same molecular weight.

In the process of the present invention, the molecular weight and density of the polyethylene wax are controlled by the amount of hydrogen and/or α-olefin fed, and by performing the reaction at high temperatures and pressures, the content of the double bonds is reduced. Generally, the double bonds exist in polyethylene obtained by using the Ziegler-type catalysts, and may cause gellation during the oxidation reaction or by cross-linking. Furthermore, according to the process of the present invention, the production of polyethylene waxes can be performed in the molten state at high temperatures, there is no production of by-product polyethylene which has super high molecular weight owing to non-uniform polymerization, and advantageously, a homogeneous polyethylene wax having a narrow molecular weight distribution can be obtained.

The polyethylene wax to be oxidized may consist essentially of straight-chain polyethylene, or may contain some side chains. The production of polyethylene having side chains may be effected efficiently by carrying out the polymerization of ethylene in the presence of a monoolefin having at least 3 carbon atoms such as propylene, 1-butene, or 1-hexene. The preferred amount of side chains is up to 100 carbon atoms per 1000 carbon atoms of polyethylene, preferably up to 30 carbon atoms. Furthermore, shorter lengths of side chains, e.g., methyl group, are preferred.

Polyethylene having long side chains such as those obtained by free radical polymerization (high pressure process) lead to a tendency for the resulting waxes to have an excessively wide distribution of molecular weight.

It is assumed that polyethylene having a small content of double bond in the main chain will be obtained by the process of the invention because ethylene is polymerized at high temperatures of 120°C. or above directly to low-molecular-weight polyethylene and a highly active carrier-supported solid catalyst component is used in the polymerization. Because of the low content of double bonds in the main chain, the polyethylene produced by the process of the present invention does not undergo cross-linkage at the time of the oxidation reaction, and an oxidized polyethylene wax having good color and thermal stability can be produced. Furthermore, as previously stated, since the polymerization of ethylene is performed at high temperatures in the molten state, a homogeneous polyethylene wax having a narrow distribution of molecular weight can be obtained without the formation of by-product polyethylene having super high molecular weight due to the non-uniform polymerization. This is also desirable for converting the polyethylene wax into an oxidized polyethylene wax.

Since polyethylene coming from the polymerization process is at high temperatures, it is partly dissolved in the polymerization solvent. If this reaction mixture is flushed into a vessel at atmospheric pressure, unreacted ethylene and the polymerization solvent are vaporized, and the molten polyethylene is separated from them. The vaporized unreacted ethylene and polymerization solvent are recycled to the polymerization vessel, and polyethylene settled at the bottom of the vessel at approximately a normal atmospheric pressure is in a molten state. In a preferred embodiment, therefore, the molten polyethylene is introduced into an oxidation reaction vessel without removing the polymerization catalyst, and oxidized there. This is preferred from the viewpoint of heat efficiency.

Another advantage of the present invention is that the polymerization catalyst component remaining in the polyethylene acts effectively in the oxidation reaction of the polyethylene although its mechanism is unknown. But when it is desired to use the oxidized polyethylene in applications wherein the inclusion of a metal compound is to be avoided, it is preferable to remove the catalyst by filtration. Of course, it is possible to remove the catalyst residue by filtration immediately after termination of the polymerization.

The oxidation of polyethylene wax is performed by passing oxygen or a gas containing oxygen, such as air, directly into the molten polyethylene free from solvent. The method in which the polyethylene is oxidized in the form of a suspension in a solvent, or the method in which polyethylene particles are oxidized while floating using an oxygen-containing gas is not desirable because of the inability to perform the oxidation uniformly.

In the present invention, the oxidation of polyethylene is carried out by heating the starting polyethylene to a temperature of above the melting point to about 140°C., and feeding oxygen or an oxygen-containing gas into the molten polyethylene. Since the starting polyethylene has a very low viscosity when it is melted even in the absence of a solvent, the reaction can sufficiently and uniformly proceed by raising blown air from the bottom of the oxidation reaction vessel as fine bubbles. Therefore, no special stirring apparatus need be utilized. For the purpose of promoting the oxidation, an organic peroxide may be added as a catalyst in an amount of 0.1 to 1% by weight based on the starting polyethylene. The organic peroxides may be those which are generally used as initiators of radical polymerization.

With the progress of the oxidation of polyethylene wax of the present invention, some quantities of water, carbon dioxide gas, hydrogen, lower ketones, alcohols, aldehydes, carboxylic acids, or hydrocarbons are formed, and the molecular weight decreases somewhat with a rise in the acid value. There is no detectable formation of gel by the occurrence of a cross-linked structure. The oxidation reaction is terminated by tracing the acid value of oxidized polyethylene and stopping the supply of oxygen at a point desired for the respective application of the product. Without any particular post-treatment, the product is useful as a commercial grade oxidized polyethylene wax.

Subsequent to the oxidation process, the oxidized polyethylene wax is modified with a suitable maleic acid compound. In order to have the requisite reactivity with the maleic acid, the oxidized wax should have an oxygen content of 0.1 to 1% by weight, which oxygen content is controlled by tracing the acid value of the polyethylene during oxidation. It is necessary that most of the bound oxygen be present in the form of peroxide. Therefore, the oxidation reaction at above 140°C must be avoided because at these temperatures, the decomposition of the peroxide occurs vigorously.

The reaction between the oxidized polyethylene wax and a maleic acid compound is carried out in the absence of oxygen. When oxygen is present during the reaction, the maleic acid compound is less reactive with the polyethylene wax. The reaction is carried out by adding the maleic acid compound to the polyethylene wax withdrawn from the oxidation reaction vessel in the absence of oxygen, preferably in an atmosphere of an inert gas such as nitrogen, at a temperature of 140°C to 180°C with agitation or mixing in any suitable mixing means as an extruder.

The foregoing modifications procedure results in the grafting of the maleic acid compound to the oxidized polyethylene wax. When unreacted maleic acid compound remains in the wax, especially when the amount of the maleic acid compound is greater than the amount of oxygen fixed in the oxidized polyethylene, the unreacted maleic acid compound may be removed by extraction with a suitable solvent or by heating under reduced pressure if the resulting product is desired to be used in applications which do not permit even small amounts of free maleic acid compound.

The term "maleic acid compound" used in the invention includes $C_1 - C_8$ dialkyl esters of maleic acid in addition to maleic acid and maleic acid anhydride. Although the amount of maleic acid compound used is not critical, it is preferred that sufficient maleic acid compound is used so that the oxygen content of the final modified polyethylene wax is from 0.1 to 5% by weight, and preferably from 0.5 to 2% by weight.

Generally, waxes, especially polyethylene waxes, have poor compatibility with water. The waxes of the present invention modified with the maleic acid compound are compatible with water, and are therefore suitable for use in emulsions. Furthermore, since these maleic acid compound-modified waxes obtained in the invention have high affinity to dyes and pigments, they are also useful as dispersing assistants for dyeing agents. Attempts to produce reinforced plastics by incorporating glass fibers into polyolefins such as polyethylene and polypropylene have frequently failed because of the poor adhesion between the polyolefins and the glass fibers. However, when the modified polyethylene wax of the present invention is added for this purpose, the adhesion between the polyolefins and the glass fibers is remarkably increased.

Polyethylene waxes modified with maleic acid compounds can react in most reactions in which maleic acid compounds react. Therefore, they can be saponified by reaction with alkalies, which improves the color of the modified wax and also the transparency. Furthermore, when they are reacted with higher alcohols or amines, half ester compounds or half amide compounds can be readily produced.

By reaction the maleic acid modified waxes obtained by the process of the present invention with alcohols, their carboxyl groups can be esterified. Usually, the esterification is performed by adding an alcohol to the wax so that the chemical equivalent ratio of the carboxyl group to the hydroxyl group of the alcohol is 0.2 to 5.0, if desired in the presence of a catalyst, at a temperature from the melting point of the wax to 200°C usually for 1 to 10 hours. Examples of the alcohols suitable for the esterification reaction include monohydric or polyhydric saturated alcohols, for example, monohydric saturated aliphatic alcohols such as methanol, ethanol, propanols, butanols, hexanols, octanols such as 2-ethylhexanol, nonanol, decanol, and undecanol, dihydric saturated aliphatic alcohols such as ethylene glycol, propylene glycols, and butylene glycols, and polyhydric alcohols such as glycerol and pentaerythritol. Suitable catalysts for this reaction include, for example, p-toluenesulfonic acid, p-toluene-sulfonyl chloride, ethyl titanate, propyl titanate, butyl titanate, and titanium tetrachloride. The amount of catalyst is usually from 0.01 to 5% based on the weight of the wax modified with the maleic acid compound. This reaction should be terminated when the acid value of the wax present in the esterification reaction system is 1/10 or less than that at the initiation of the reaction.

The present invention will be described in greater detail below by working Examples. In each of the Examples, the average particle diameter of the carrier was measured by the sedimentation method, and calculating the weight average of particles having the respective sizes. The properties of the resulting ethylene polymer were measured as follows:

VISCOSITY AVERAGE MOLECULAR WEIGHT

The viscosity of the polymer is measured at 135°C using decalin as a solvent, and the viscosity average molecular weight is then calculated by the following formula: $M_r = 2.51 \times 10^4 [\eta]^{1.235}$

SOFTENING POINT

Measured by the ring and ball test in accordance with JIS K2531.

HARDNESS

Measured by the penetration method in accordance with JIS K2530.

MELT VISCOSITY

Measured at 140°C.

NUMBER OF METHYL BRANCHES

Measured by the infra-red spectrum method.

EXAMPLE 1

Ethylene was polymerized at 160°C in the presence of hydrogen in a hexane solvent using as a catalyst triethylaluminum and titanium tetrachloride supported on magnesium oxide prepared by suspending dry magnesium oxide having an average particle diameter of 1 micron and a specific surface area of 50 m²/g in titanium tetrachloride allowing the suspension to stand for 1.5 hours at 135°C, washing with dehydrated hexane and drying. Some 6 millimoles of carrier supported catalyst (calculated as titanium) were charged to a pressure polymerization vessel along with 20 millimoles of triethylaluminum and 90 liters of hexane per hour. The ethylene, hydrogen, and hexane were charged continuously so that 8 mole % of hydrogen was present. Polyethylene wax was obtained after removing the volatile matter, which had a softening point of 129°C, a molecular weight of 2,500, and a density of 0.976 g/cm³. The resulting polyethylene wax was stirred at 130°C and 30 liters of air were fed per hour per 100 g of polyethylene wax. After the 5-hour reaction, the polyethylene wax had an oxygen content of 0.5% by weight. Two hundred grams of the oxygen-pretreated polyethylene wax were put into a nitrogen-purged reactor, and as soon as the temperature was raised to 150°C, 0.5 g of maleic anhydride was added. Then, the reaction was continued for one hour, and the product was cooled. The modified polyethylene wax obtained was dissolved in 150 ml. of xylene by heating. The solution was gradually poured into 2 liters of cold acetone to precipitate the wax, followed by filtration. This procedure was repeated, and the resulting wax was dried in vacuo for 15 minutes at 60°C. This procedure resulted in the removal of unreacted maleic anhydride and a homopolymer of maleic anhydride.

The resulting modified polyethylene wax had an acid value of 13.6. The infra-red spectrum of the wax indicated clear absorption of carbonyl of the acid anhydride at 1781 cm$^{-1}$, and 1860 cm$^{-1}$. The resulting modified polyethylene wax readily formed into a half ester by reaction with dodecanol at 150°C.

EXAMPLE 2

Using the catalyst of Example 1, ethylene was polymerized at 160°C in the presence of hydrogen and propylene, to yield polyethylene wax having a molecular weight of 1600, a density of 0.926 g/cm³, and a softening point of 121°C. The resulting polyethylene wax was oxidized with air at 130°C in the same way as set forth in Example 1, and then modified with maleic anhydride. The following table shows the relation between the oxidizing time and the modified polyethylene wax.

| Oxidation Time (Hours) | Maleic Anhydride Amount Added (% By Weight) | Reaction Time (Hours) | Modified Oxygen Content (Wt. %) | Polyethylene Wax Molecular Weight | Acid Value |
|---|---|---|---|---|---|
| 3 | 0.5 | 1 | 0.35 | 1,500 | 5.8 |
| 5 | 0.5 | 1 | 0.78 | 1,600 | 14.3 |

EXAMPLE 3

Polyethylene wax obtained in Example 1 was oxidized with air to an oxygen content of 0.92% by weight, and then reacted with maleic acid, and maleic acid dialkyl esters, respectively. The reaction was performed for 2 hours at 160°C. The properties of the resulting modified polyethylene wax are given in the following table

| Maleic acid compound | | Modified polyethylene wax | | |
|---|---|---|---|---|
| Kinds | Amounts (% by weight) | Molecular Weight | Acid Value | Saponification Value |
| Maleic acid | 2 | 2,300 | 8.6 | — |
| Maleic acid dimethyl ester | 2 | 2,500 | 0.92 | 9.5 |
| Maleic acid dioctyl ester | 2 | 2,400 | 0.81 | 7.6 |

What we claim is:

1. A process for producing a waxy maleic acid modified ethylene polymer comprising polymerizing ethylene in a saturated hydrocarbon as a polymerization solvent in the presence of hydrogen, an α-olefin or mixture thereof using as a catalyst a halogen compound of titanium, vanadium or mixtures thereof supported on a carrier composed of a hydrocarbon-insoluble magnesium-containing compound, and an organoaluminum compound under the following conditions:

a. the atomic ratio of aluminum to titanium, vanadium or mixtures thereof in the catalyst being 1–100:1;
   b. the concentration of the catalyst in the polymerization solvent being such that the atom amount of the aluminum in the catalyst is 0.01 to 10 millimoles per liter of the polymerization solvent;
   c. ethylene, hydrogen and α-olefin being fed in amounts such that the vapor phase in the polymerization vessel excepting the vapor portion of the solvent consists of 5 to 90 molar percent of hydrogen, 0 to 35% of α-olefin and the remainder being ethylene; and
   d. the polymerization temperature being a temperature at which the resultant polymer is present as liquid, and the polymerization pressure being from 20 to 100 kg/cm²;

to form said waxy ethylene polymer having a density of 0.85 to 0.98 g/cm³ and a viscosity average molecular weight of 400 to 20,000; separating said waxy ethylene polymer from the polymerization solvent; feeding oxygen or an oxygen-containing gas into a melt of said waxy ethylene polymer at a temperature above the melting point of said ethylene polymer and up to 140°C to obtain an oxidized ethylene polymer containing peroxide groups and an oxygen content of 0.1 to 1% by weight; and reacting said oxidized ethylene polymer with a maleic acid compound in the absence of oxygen at 140°C. to 180°C.

2. A process of claim 1, wherein the vapor phase within the polymerization vessel excepting the vapor portion of the solvent consists of 5 to 60 molar percent of hydrogen and the remainder ethylene.

3. A process of claim 1, wherein the magnesium-containing compound contains aluminum in addition to magnesium.

4. A process of claim 1, wherein the halogen compound of titanium, vanadium or mixtures thereof is tetrahalide or oxychloride.

5. A process of claim 1, wherein said maleic acid modified wax is reacted with an alcohol.

6. A process for producing a waxy maleic aid modified ethylene polymer comprising polymerizing ethylene in melted waxy polyethylene as a polymerization solvent in the presence of hydrogen, an α-olefin or mixture thereof using as a catalyst a halogen compound of titanium, vanadium or mixtures thereof supported on a carrier composed of a hydrocarbon-insoluble magnesium-containing compound, and an organoaluminum compound under the following conditions:
a. the atomic ratio of aluminum to titanium, vanadium or mixtures thereof in the catalyst being 1–100:1;
b. the concentration of the catalyst in the polymerization solvent being such that the atom amount of the aluminum in the catalyst is 0.01 to 10 millimoles per liter of the polymerization solvent;
c. ethylene, hydrogen and α-olefin being fed in amounts such that the vapor phase in the polymerization vessel excepting the vapor portion of the solvent consists of 5 to 90 molar percent of hydrogen, 0 to 35% of α-olefin and the remainder being ethylene; and
d. the polymerization temperature being a temperature at which the resultant polymer is present as liquid, and the polymerization pressure being from 5 to 100 kg/cm$^2$;

to form said waxy ethylene polymer having a density of 0.85 to 0.98 g/cm$^3$ and a viscosity average molecular weight of 400 to 20,000; separating said waxy ethylene polymer from the polymerization solvent; feeding oxygen or an oxygen-containing gas into a melt of said waxy ethylene polymer at a temperature above the melting point of said ethylene polymer and up to 140°C to obtain an oxidized ethylene polymer containing peroxide groups and an oxygen content of 0.1 to 1% by weight; and reacting said oxidized ethylene polymer with a maleic acid compound in the absence of oxygen at 140°C. to 180°C.

7. A process of claim 6, wherein the vapor phase within the polymerization vessel excepting the vapor portion of the solvent consists of 5 to 60 molar percent of hydrogen and the remainder ethylene.

8. A process of claim 6, wherein the magnesium-containing compound contains aluminum in addition to magnesium.

9. A process of claim 6, wherein the halogen compound of titanium, vanadium or mixtures thereof is tetrahalide or oxychloride.

10. A process of claim 6, wherein said maleic acid modified wax is reacted with an alcohol.

11. A process of claim 6, wherein said polymerization solvent includes a saturated hydrocarbon.

* * * * *